(12) United States Patent
Berranger

(10) Patent No.: US 8,104,024 B2
(45) Date of Patent: Jan. 24, 2012

(54) VOICE MARK-UP LANGUAGE AND INTERPRETER

(75) Inventor: Jean-Alexis Berranger, Meylan (FR)

(73) Assignee: Hewlett-Packard Development Company., L.P., Houston, TX (US)

( * ) Notice: Subject to any disclaimer, the term of this patent is extended or adjusted under 35 U.S.C. 154(b) by 1319 days.

(21) Appl. No.: 10/545,524

(22) PCT Filed: Oct. 15, 2004

(86) PCT No.: PCT/EP2004/052552
§ 371 (c)(1),
(2), (4) Date: Aug. 25, 2006

(87) PCT Pub. No.: WO2005/039163
PCT Pub. Date: Apr. 28, 2005

(65) Prior Publication Data
US 2006/0294456 A1      Dec. 28, 2006

(30) Foreign Application Priority Data
Oct. 17, 2003   (EP) .................................... 03292582

(51) Int. Cl.
*G06F 9/45* (2006.01)
(52) U.S. Cl. ........................................................ 717/139
(58) Field of Classification Search .................. 717/139, 717/136
See application file for complete search history.

(56) References Cited

U.S. PATENT DOCUMENTS

| | | | |
|---|---|---|---|
| 6,583,716 B2 * | 6/2003 | Rangarajan et al. | 340/7.56 |
| 7,366,777 B2 * | 4/2008 | Hill et al. | 709/226 |
| 2002/0001370 A1 * | 1/2002 | Walker et al. | 379/88.04 |
| 2003/0233147 A1 * | 12/2003 | Nicholson et al. | 623/17.16 |
| 2003/0233238 A1 * | 12/2003 | Creamer et al. | 704/270.1 |

FOREIGN PATENT DOCUMENTS

| | | |
|---|---|---|
| CN | 1368719 A | 9/2002 |
| EP | 1 041 801 A | 10/2000 |

OTHER PUBLICATIONS

"The Layered Approach: the OSI Model", Data and Computer Communications, XX,XX, pp. 446-456, paragraph 4—paragraph 5.
"Voice Extensible Markup Language", retrieved Nov. 3, 2006 from http://www.w3.org/TR/voicexm120.
"Voice Browser Interoperation: Requirements" retrieved Nov. 3, 2006 from http://www.w3.org/TR/2002/WD-vbi-reqs-20020808/#overview.
Brill, Manfred ~ "Die Anwendernahen Sonichten im-ISO/OSI-Modell" ~ Elektronik ~ vol. 37, No. 5 ~ Mar. 1988 — pp. 77-78, 80-82 ~ Munchen, Germany (German Only).
Brill, Manfred ~ "THe User-Oriented Laters in the ISO/OSI Model" ~ English translation ~ for the reference listed above.

* cited by examiner

Primary Examiner — John Chavis

(57) ABSTRACT

A voice markup language for a service for a telecommunication service platform, the telecommunication service platform having a communication layer and a session layer, the language comprising an application transfer tag, the application transfer tag comprising an identifier corresponding to a further service provided on the telecommunication service platform, wherein the application transfer tag causes the session layer to cause a call connected to the service to be processed by the further service.

11 Claims, 4 Drawing Sheets

VOICE MARK-UP LANGUAGE AND INTERPRETER

FIELD OF THE INVENTION

This invention relates to a voice mark-up language, and interpreter for the voice mark-up language, a service and a telecommunication service platform.

BACKGROUND OF THE INVENTION

An important part of the business of a telecommunication company or organisation is in the provision of services other than simply providing dialled voice connections between users. Examples of such services are voice mail, conference calls, information services and so on.

Conventionally, the programs to provide such services herein referred to as "service applications" are written in compiled languages, such as Java or C++. A large proportion of the existing or legacy software providing such services is in such a compiled form and has the benefits that it has been optimised and is generally reliable. The disadvantage is that such compiled service applications are static, dint is their structure and code are well established, and the programs are difficult to adapt or customise.

To provide easily customised services, interpreted scripting languages have been developed which ease the authoring of new services or providing customisation of services. Examples of these are the Voice Extendible Mark-up Language ("Voice XML" or "VXML") SALT or variants thereof which will in this specification be referred to generally as "voice mark-up languages". The voice mark-up languages are interpreted languages similar in structure to HTML. A script written in a voice mark-up language comprises a series of instructions or tags which are interpreted and acted on in sequence by an interpreter. The interpreter is able to receive input in the form of speech and generate an audible output whether in the form of speech generation from text or in the form of saved audio files or otherwise. Appropriate commands in a voice mark-up language also permit the script to accept inputs in the form of DTMF tones from a telephone. A service application written using a voice mark-up language may be in the form of a plurality of pages, analogous to a set of HTML pages made available over the World Wide Web where each page is identified by a uniform resource locator ("URL").

An appropriate computer system for providing a plurality of services, hereinafter referred to as a telecommunication service platform, of known type is shown in FIG. 1. Referring now to FIG. 1, a telecommunication service platform is shown generally at 10. The telecommunication service platform 10 has a plurality of layers. Starting from the top, a service layer is shown at 11. This generally includes all the programs or service applications which provide services running on the platform 10 including interpreters and service wrappers where appropriate. The service layer is supported by the session layer 12, which manages calls connected to individual services, that is it allocates and manages the resources needed to provide the required service for a call. The communication layer 13 gives access to network, media and system resources. In this example, the communication layer 13 has a media processing layer 13a which provides media resources to the service layer 11 and a signalling layer 13b which gives access to the network and system resources needed to control calls at a network level. For simplicity, in this example the communication layer 13 comprises the various protocol stacks. At 14, the hardware layer is shown including the physical component necessary to provide the voice connection channels 14a and signalling channels generally shown at 14b to receive and establish calls over a telecommunication network.

The session layer 12 itself has two layers. As shown at 15, an appropriate interface is provided, preferably in the form of an open application programming interface ("API"). The API provides a set of functions which may be called or invoked by a service application in a way which is independent of the underlying network protocol and hardware. A media controller 16a provides control of the media resources available through the media processing layer 13a A platform framework or call controller shown at 16b performs the necessary scheduling, resource and session management function between the interface 15 and the communication layer 13.

In the service layer 11, a number of different types of service applications to provide services are illustrated. At 17, a voice mark-up language interpreter is shown operable to read service applications 18, 19 which are implemented as voice mark-up language scripts. At 20 and 21, compiled applications are illustrated which are able to communicate directly with the interface 15. At 22, a non-native application is shown, for example a service application written in a language not directly compatible with the interface 15, which is provided with a service wrapper 23, for example an API adapter, to adapt messages transmitted between the interface 15 and the application 22 into an appropriate format.

To provide adaptable and efficient services, it is desirable that applications of different types be able to interact. Voice mark-up language-implemented services are desirable in that they provide easily authored and adapted service applications but have disadvantages in that the language does not permit a very sophisticated logic and large grammar or numbers of grammars to be known for a given application, where the term "grammar" refers to the set of allowed (and thus identifiable) words. The relatively unsophisticated logic also does not allow the interpreter to make assumptions about what the interaction steps will be. For example, in a voice mail service, it might be assumed that the user will wish to listen to new messages whilst being connected to the service and so new messages could be uploaded in advance to be ready to be played while receiving the appropriate instructions; this is relatively straight forward to implement in a compiled service application, but cannot easily be done with a service application written in voice mark-up language. As discussed above, a quantity of optimised reliable legacy software exists in compiled form, and it would be desirable to be able to use such compiled service applications in conjunction with service applications written using a mark-up language.

It is known to transfer calls between compiled service applications by making an appropriate call to the API 15, for example using the method ReleasedToService method in the Java Telephony Application Programming Interface ("JTAPT") Media application. Such a call is not however accessible by a voice mark-up language script. It is possible to call other mark-up language applications, from a script for example using the <subdialog> or <link> tags in VXML, or to transfer a call using the <transfer> tag which causes a call to be redirected to another number or application indicated by a URL at the network level.

An aim of the present invention is thus to permit easier interaction between voice markup language service applications and compiled service applications.

SUMMARY OF THE INVENTION

According to a fist aspect of the invention, we provide a voice markup language for a service application for a telecommunication service platform, the telecommunication service platform having a communication layer and a session layer, the voice mark-up language comprising an application transfer tag, the application transfer tag comprising an identifier corresponding to a further service provided on the telecommunication service platform, wherein the application transfer tag causes the session layer to cause a call connected to the service to be processed by the further service.

The application transfer tag may comprise a parameter indicating whether the call is to be processed by the originating service on completion of the processing by the further service.

The application transfer tag may comprise a parameter corresponding to a result returned by the further service, whereby on completion of the processing by the ether service the result is returned to the originating service.

According to a second aspect of the invention, we provide a voice markup language interpreter for a service for a telecommunication service platform having a communication layer and a session layer, the interpreter being operable to process a script for the service and generate an output to be passed to the telecommunication service platform in accordance with the script, the script being written in a voice markup language of the above type, wherein when the script contains a application transfer tag, the interpreter is operable to read the identifier and generate an output to be passed to the telecommunication service platform to cause the session layer to cause a call connected to the service to be processed by a further service corresponding to the identifier provided on the telecommunication service platform.

The interpreter may be operable to read a parameter of the application transfer tag and generate an output accordingly.

The further service may have a platform service name recognised by the telecommunication service platform, and wherein the interpreter is operable to read a registry to find the platform service name corresponding to the identifier and generate the output comprising the platform service name.

The output may comprise a call to an application programming interface of the telecommunication service platform.

The output may comprise a message to a service wrapper operable to generate a call to an application programming interface of the telecommunication service platform.

According to a third aspect of the invention, we provide a service for a telecommunication service platform, the service application comprising a script which may be processed by a voice markup language interpreter, the script being written in a voice markup language.

According to a fourth aspect of the invention, we provide a call controller for a telecommunication service platform having a communication layer and a session layer, the call controller being located in the session layer, the call controller being operable to receive an instruction from a voice markup language interpreter to cause a call connected to a service to be processed by a further service corresponding to an identifier, wherein the further service has a platform service name recognised by the telecommunication service platform, and wherein the call controller is operable to read a registry to obtain the platform service name corresponding to the identifier and cause the call to be processed by the further service corresponding to the platform service name.

According to a fifth aspect of the invention, we provide a telecommunication service platform having a communication layer, a session layer and a service layer, the communication layer being operable to establish a call, and the session layer being operable to connect the call to a desired service application in the service layer for processing by the service application, wherein the service application comprises a script, the script being written in a voice markup language and the service layer comprises a voice markup language interpreter operable to process the script, the voice markup language comprising an application transfer tag, the application transfer tag comprising an identifier corresponding to a further service provided on the telecommunication service platform, wherein when the script contains a application transfer tag, the interpreter is operable to read the identifier and generate an output to be passed to the session layer to cause the call connected to the service to be processed by a further service corresponding to the identifier provided on the telecommunication service platform.

According to a sixth aspect of the invention, we provide a method of providing a service for a telecommunication service platform, comprising the steps of processing a script for a service application to provide the service wherein the script is written in a voice markup language and comprises an application transfer tag, reading the application transfer tag and reading an identifier corresponding to a further service application in the tag, and causing a call being processed by the service application to be processed by the further service application.

A service application written in a voice mark-up language can thus, in accordance with the present invention invoke another application and particularly a compiled service application by invoking an appropriate method provided by an API of the telecommunication service platform without requiring a call to be transferred or redirected at the network level.

BRIEF DESCRIPTION OF THE DRAWINGS

Some embodiments of the present invention will now be described by way of example only with reference to the accompanying drawings wherein.

DETAILED DESCRIPTION OF THE PREFERRED EMBODIMENTS

Figure 1:
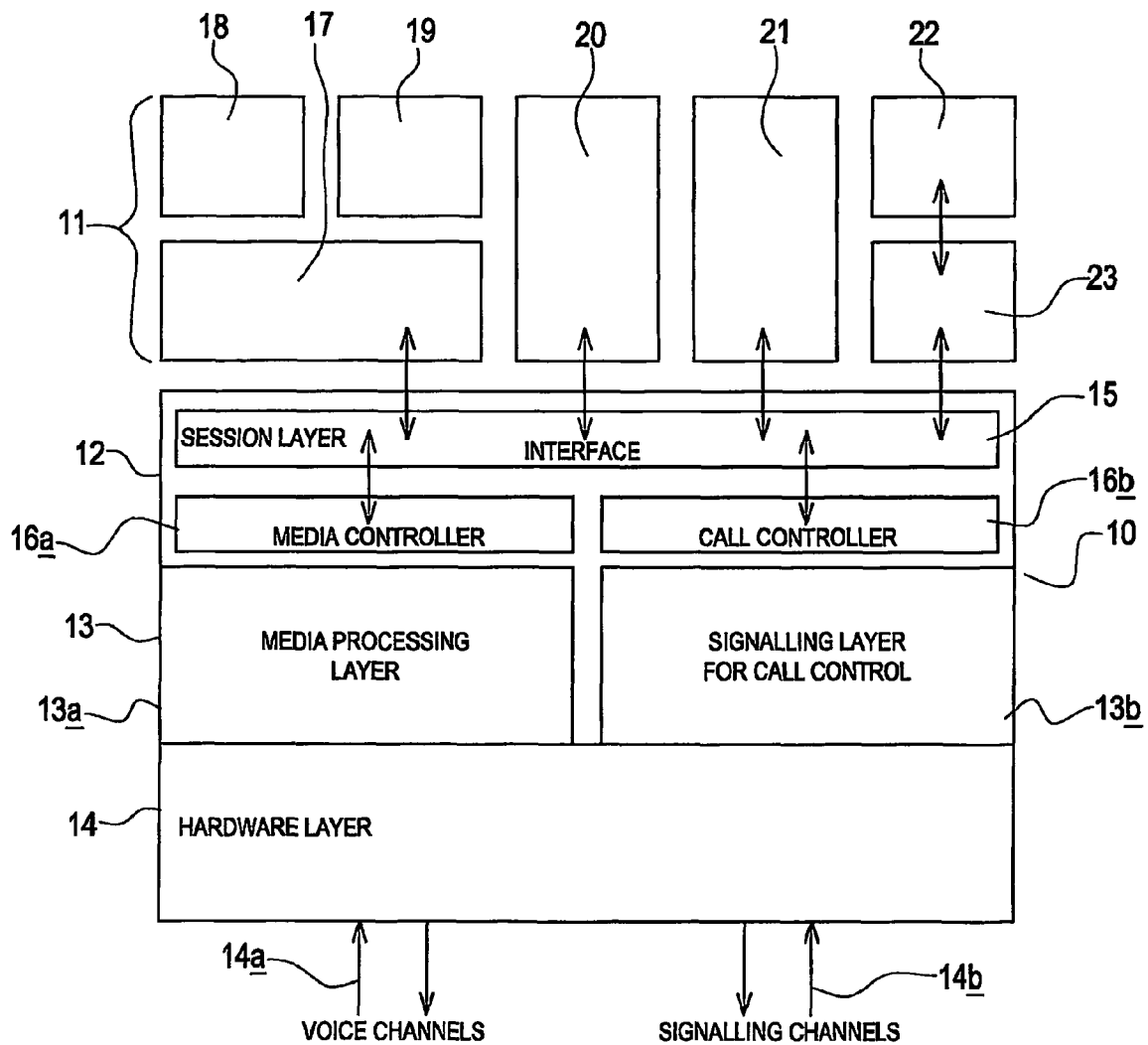
FIG. 1 is a diagrammatic illustration of a known telecommunication service platform.
Figure 2:
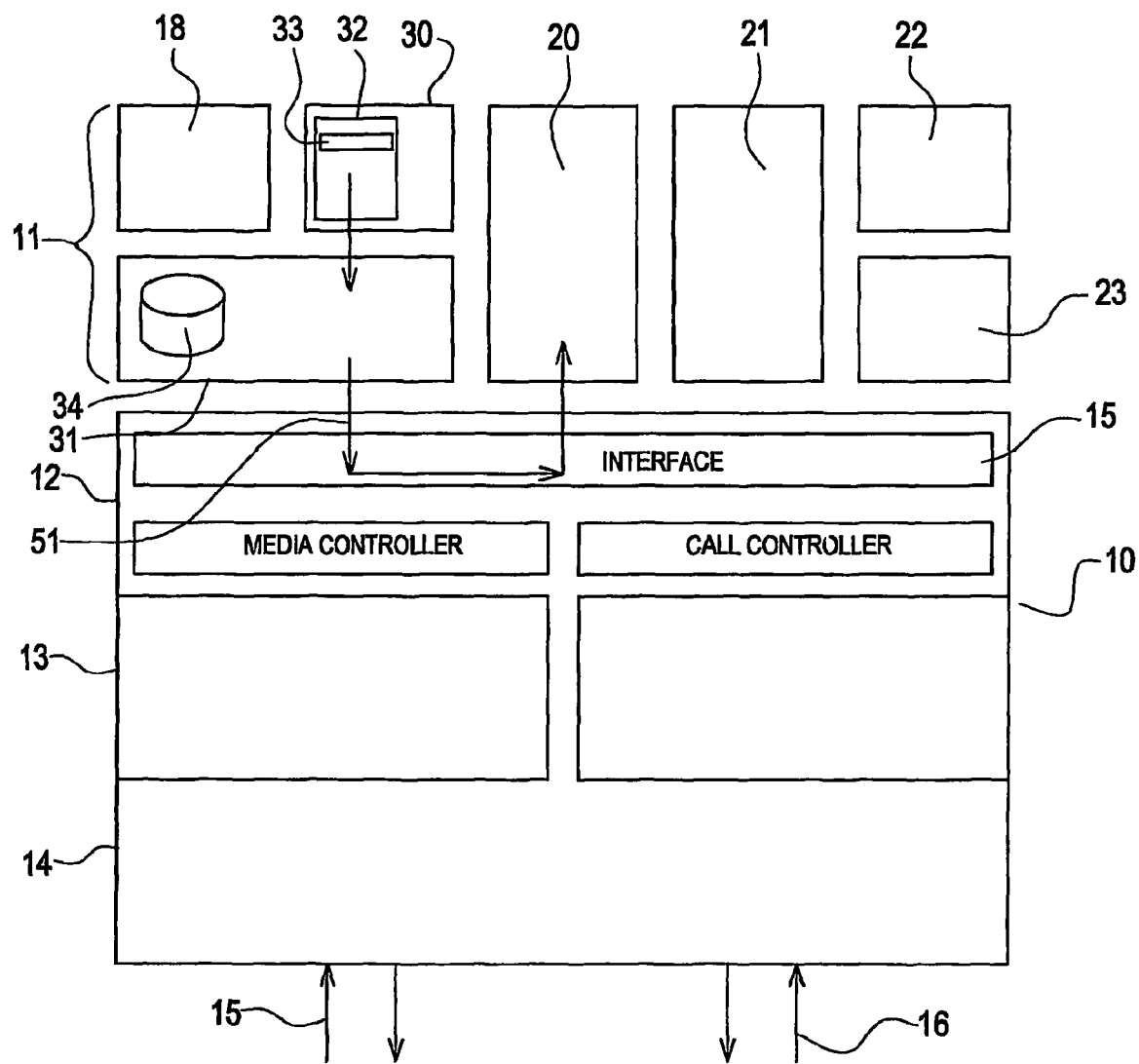
FIG. 2 is a diagrammatic illustration of a telecommunication service platform embodying the present invention.

Referring now to FIG. 2, a telecommunication platform 10 similar to that shown in FIG. 1 is illustrated. In this example however, the service layer 11 comprises a service application 30 written in a voice mark-up language embodying the present invention, and a voice mark-up language interpreter 31 embodying the present invention. The service layer also comprises other service applications as described in relation to FIG. 1, in particular native service applications 20, 21 which comprise compiled programs which are able to communicate directly with the interface layer 15 of the session layer 12. Each service application 20, 21, 22 is identified by a platform service name to permit calls to be routed to that service by the session layer 12. The service application 30 is implemented as a voice mark-up language script generally indicated at 32, which includes a application transfer tag 33. The application transfer tag indicates that a further service application 20, 21, 22 is to process a call being processed by the service application 30.

The application transfer tag 33 may be of the form

<apptransfer target=identifier, return parameter, result parameter, . . . >. The application transfer tag thus comprises an identifier which indicates a further service application which is to process the call. The application transfer tag also includes further arguments, such as a return parameter indicating whether or not the service application is to continue to process a call after the processing has been performed by the further service application, a result parameter which indicates whether or not a result is to be returned from the further service application, and indeed any other parameters may be included in the application transfer tag as required.

It may be that the identifier included in the application transfer tag 33 is not the same as the platform service name of the further service, application required. It might be envisaged for example that the identifier is the name of a generic service type while the platform service name is the specific identifier of the service application implemented on the telecommunication service platform 10 which provides that service. To accommodate this, the voice mark-up language interpreter 31 is provided with a registry 34 which maps the identifier to the corresponding platform service name.

Although the voice markup language interpreter 31 is showing communication directly with the interface 15 of the session layer 12, it will be apparent that if necessary, a service wrapper or other intermediate layer may be provided between the interpreter 31 and the interface 15.

In the particular example of voice XML, a call control extendible markup language ("CCXML") script and interpreter may be located between the voice markup language interpreter 31 and the session layer 12. CCXML is specifically intended to provide call control functionality not available in VXML and so in this example the service application 30 may be written to be completely independent of the required call control functionality. Of course, other service wrappers or intervening adapters may be used as required or as desired.

Figure 3:
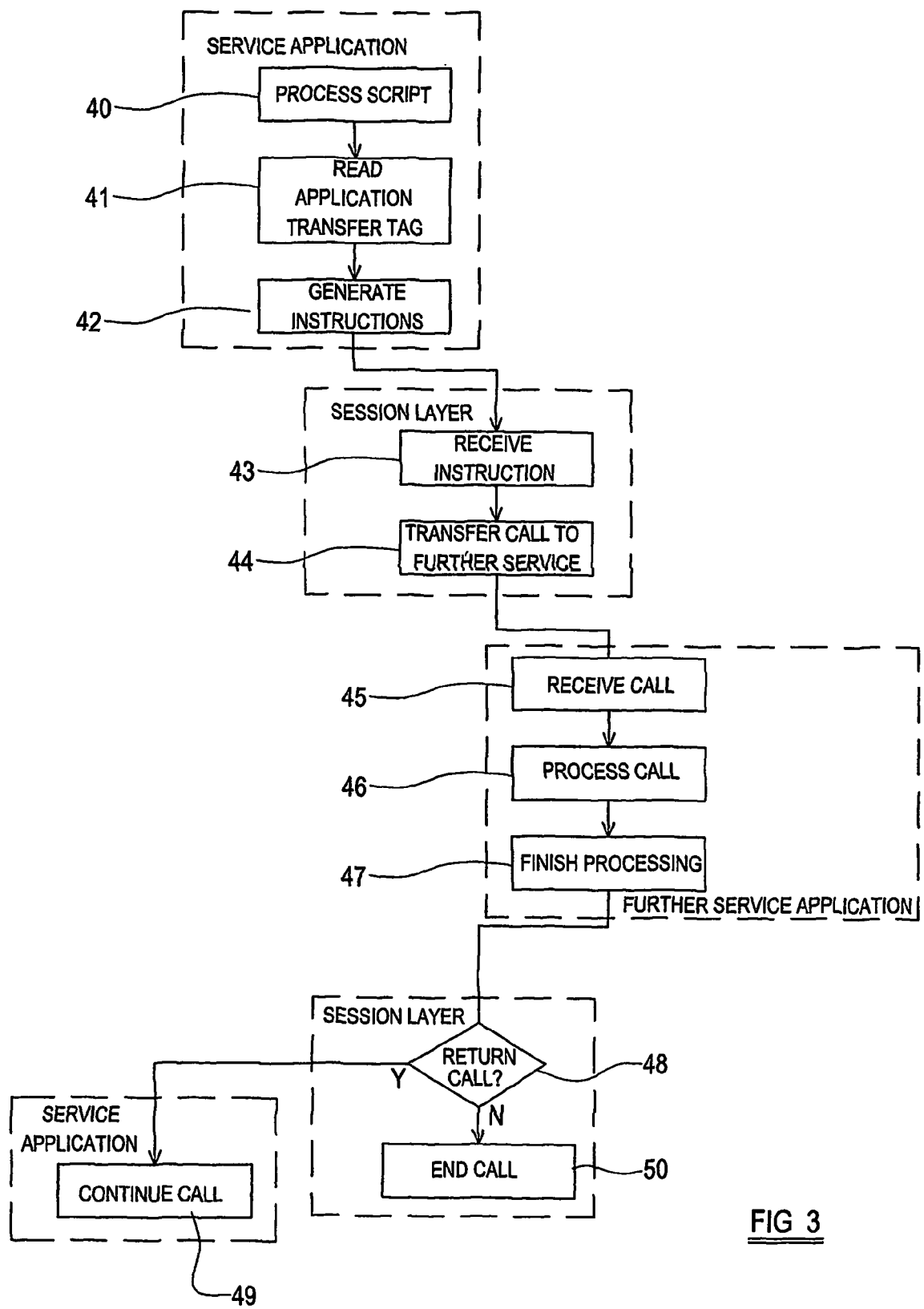
FIG. 3 is a flow diagram of a method embodying the present invention.

The operation of the invention will now be discussed with reference to FIG. 3. First, it is presumed that a call has been received by the telecommunications service platform 10 and has been routed by the communication layer 13 and session layer 12 in known manner to the service application 30 to process. The script 32 is thus interpreted by the voice mark-up language interpreter 31 which passes messages to and from the session layer 12 as appropriate. At step 41, the voice mark-up language interpreter 31 reads the application transfer tag 33, and at step 42 generates a transfer request in accordance with information contained in the application transfer tag 33 to cause the call to be processed by a further service application. This call is then passed to the session layer 12 in the form of an appropriate instruction to the interface 15. In the JTAPI media specification, this might use the method void ReleasedToService (disposition, time out) which releases the call from the service application 30 to the application service indicated by the disposition parameter within the time out time required. At step 43 this message is received by the interface layer and at step 44 the interface 15 causes the call to be re-routed to the identified further service application 20. This is represented by arrow 51 in FIG. 2. At step 45, the further service application 20 receives the call as if it was a new call and at step 46 processes the call. When processing has been completed as shown at step 47, the further service application 20 releases the call by means of a standard instruction to the interface layer 15. At step 48, the platform framework checks whether or not the call is to be returned to the service application 30; if yes, at step 49 the service application 30 continues processing the call, possibly using a result returned from the further service application, otherwise at step 50 the call is ended in conventional manner.

Figure 4:
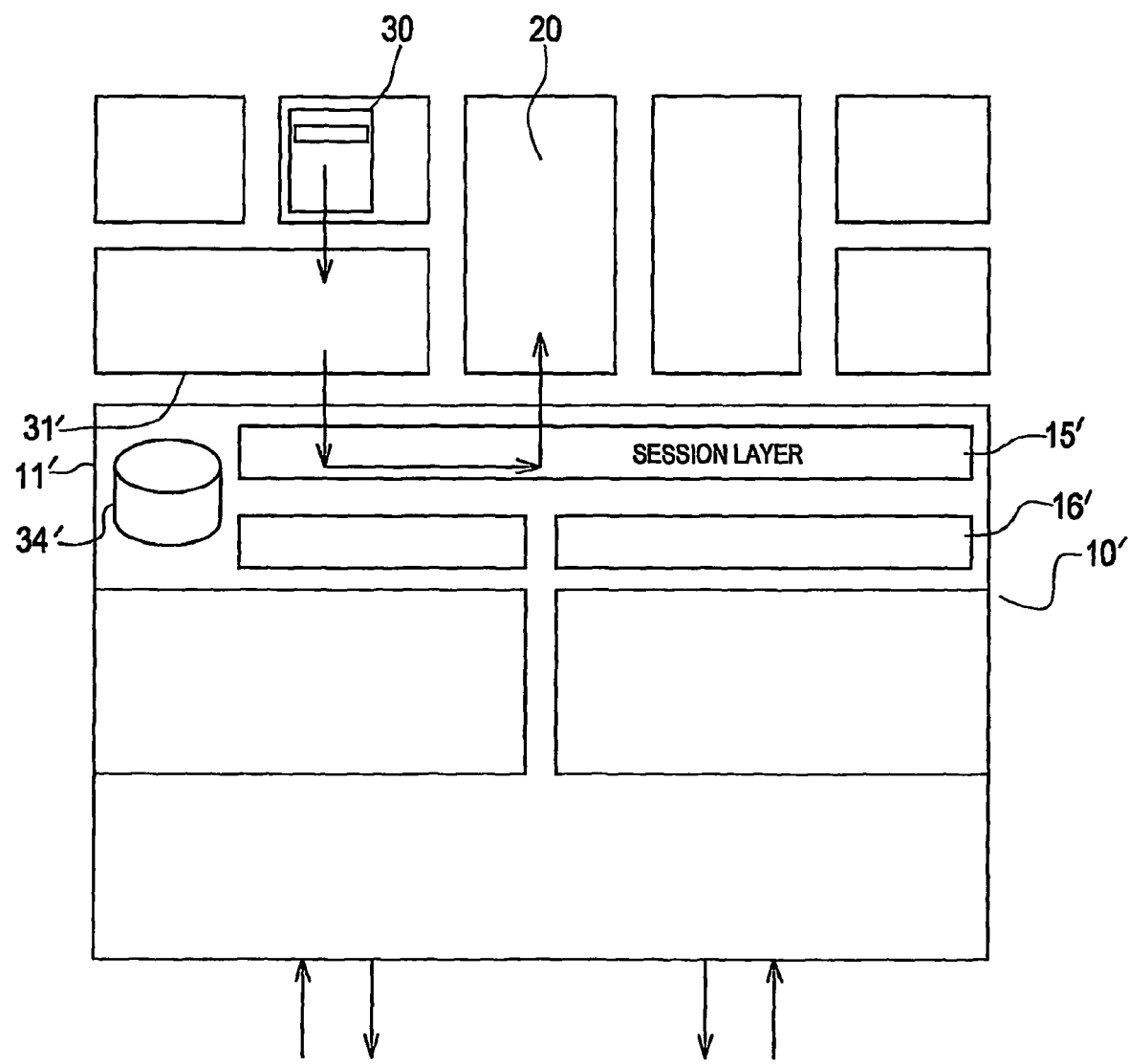
FIG. 4 is a diagram of a further telecommunication service platform embodying the present invention.

The step of consulting the registry 34 to map the identifier in the application transfer tag to the platform service name of the server so this application 20 may be performed by the voice mark-up language interpreter 31 at any appropriate time, for example when generating the output instruction at step 42. In an alternative embodiment as shown in FIG. 4, in the telecommunication platform 10', a registry 34' is provided as part of the session layer 11' and not as part of a voice mark-up language interpreter 31'. The instruction generated by the voice mark-up language 31 at step 42 may then simply contain the identifier present in the application transfer tag 33, and the step of mapping the identifier to the platform service name of the further service application 20 is performed by the session layer 12, for example by the call controller 16', at step 44.

The telecommunication platform 10, 10' may thus be used to provide any appropriate service or combination of services as appropriate. For example, purely by way of an example, a user may call a number associated with voice mail and information services offered to that user. The call is received by the telecommunication service platform 10 and routed to the service application 30. The service application 30 provides an easily coded and adapted portal. Thus, for example the script 32 may be written to play a welcome message and then render a menu of choices available to the user, offering for example access to voice mail, weather information, a booking service or to end the call. The user then returns a choice for example by pressing a button on his keypad to return a DTMF tone which may be detected by the service application 30, or by a voice response, for example "voice mail". When the user selects an option corresponding to a particular service application will cause the call to be transferred to that service application to provide that service by the appropriate application transfer tag 33. Once the user has finished listening to his voice mail, the voice mail service application, in this example the further service application 20, will return the call to the service application 30 which may then offer a menu to the user to continue the call, or play a goodbye message and end the call as appropriate. In this manner, the service application 30 provides a portal through which a user is able to access services provided by the compiled service applications 20, 21. It will be apparent that the flexibility of this invention is such that any appropriate application may be implemented as desired.

In the present specification "comprises" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse toes hereof.

The invention claimed is:

1. A non-transitory computer readable medium including machine readable instructions that when executed by computer hardware provide a voice markup language interpreter for a service for a telecommunication service platform having a communication layer and a session layer,
the interpreter to process a script of a first service application in response to a call and generate an output to be passed to the telecommunication service platform in accordance with the script,
the script being written in a voice markup language and containing an application transfer tag, wherein the application transfer tag includes an identifier identifying a second service application, and a return parameter indicating whether the call is to be processed by the first service application upon completion of a processing by the second service application;

the interpreter to read the identifier and generate an output to be sent to the session layer based on the identifier, wherein the session layer is to send the call to the second service application to be processed based on the output of the interpreter, determine whether to return the call to the first service application based on the return parameter of the application transfer tag, and send the call from the second service application to the first service application responsive to a determination that the call is to return to the first service application.

2. A non-transitory computer readable medium according to claim 1, wherein the application transfer tag further comprises a result parameter indicating whether a result is to be returned by the second service application to the first service application, whereby upon completion of the processing by the second service application, a result is sent from the second service application to the first service application.

3. A non-transitory computer readable medium according to claim 1 wherein the second service application has a platform service name recognized by the telecommunication service platform, and wherein the interpreter is operable to read a registry to find the platform service name of the second service application corresponding to the identifier and generate an output comprising the platform service name.

4. A non-transitory computer readable medium according to claim 1 wherein the output generated by the interpreter is sent to an application programming interface of the session layer of the telecommunication service platform.

5. A non-transitory computer readable medium according to claim 1 wherein the output comprises a message to a service wrapper operable to generate a call to an application programming interface of the telecommunication service platform.

6. A non-transitory computer readable medium including machine readable instructions that when executed by computer hardware provide a call controller for a telecommunication service platform having a communication layer and a session layer, the call controller being located in the session layer, the call controller to receive a call and cause the call to be processed by a first service application in the telecommunication service platform, wherein a script of the first service application includes an application transfer tag, and wherein the application transfer tag includes an identifier identifying a second service application and a return parameter indicating whether the call is to be processed by the first service application upon completion of a processing by the second service application;

the call controller to receive an instruction from a voice markup language interpreter to cause the call connected to a first service application to be processed by the second service application based on the identifier of the application transfer tag, wherein the second service application has a platform service name recognized by the telecommunication service platform, and wherein the call controller is operable to read a registry to obtain the platform service name of the second service application corresponding to the identifier and cause the call to be processed by the second service application.

7. A telecommunication service platform comprising computer hardware, a communication layer, a session layer and a service layer, the communication layer being operable to establish a call, and the session layer to connect the call to a first service application in the service layer for processing by the first service application, wherein the service application comprises a script, the script being written in a voice markup language and the service layer comprises a voice markup language interpreter operable to process the script, the voice markup language comprising an application transfer tag, the application transfer tag comprising an identifier identifying a second service application provided on the telecommunication service platform and a return parameter identifying whether the call is to be processed by the first service application upon completion of a processing by the second service application, wherein the interpreter is to read the identifier of the application transfer tag to identify the second service application and generate an output to be sent to the session layer based on the identifier, wherein the session layer is to send the call to the second service application to be processed based on the output generated by the interpreter, determine whether to return the call to the first service application based on the return parameter of the application transfer tag, and send the call from the second service application to the first service application responsive to a determination that the call is to return to the first service application.

8. A method of providing a service for a telecommunication service platform, comprising the steps of:

the telecommunication service platform receiving a call;

processing a script of a first service application in response to the call to provide the service for the telecommunication service platform, wherein the script is written in a voice markup language and comprises an application transfer tag, and wherein the application transfer tag includes an identifier identifying a second service application, and a return parameter indicating whether the call is to be processed by the first service application upon completion of a processing by the second service application;

reading the identifier of the application transfer tag to identify the second service application;

sending the call from the first service application to the second service application based on the identifier;

processing the call by the second service application;

determining whether to return the call to the first service application based on the return parameter of the application transfer tag.

9. The method according to claim 8, further comprising:

sending the call from the second service application to the first service application responsive to a determination that the call is to return to the first service application.

10. The method according to claim 8, wherein the application transfer tag further comprises a result parameter indicating whether a result is to be returned from the second application to the first service provider, and the method further comprising:

reading the result parameter of the application transfer tag; and upon completion of the processing by the second service application, sending a result from the second service application to the first service application based on the result parameter of the application transfer tag.

11. The method according to claim 8, further comprising:

after reading the identifier and before sending the call from the first service application to the second service application, using a registry to map the identifier to a platform service name of the second service application.

* * * * *